United States Patent
Hirsave et al.

(10) Patent No.: US 8,261,353 B2
(45) Date of Patent: Sep. 4, 2012

(54) METHOD, APPARATUS, AND PROGRAM PRODUCT FOR AUTONOMIC PATCH DEPLOYMENT BASED ON AUTONOMIC PATCH RISK ASSESSMENT AND POLICIES

(75) Inventors: Praveen Prasanna Kumar Hirsave, Austin, TX (US); Puthukode G. Ramachandran, Austin, TX (US); Edmund Troche, Austin, TX (US); Minto Tsai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 12/131,562

(22) Filed: Jun. 2, 2008

(65) Prior Publication Data

US 2008/0263534 A1 Oct. 23, 2008

Related U.S. Application Data

(63) Continuation of application No. 11/195,023, filed on Aug. 2, 2005, now abandoned.

(51) Int. Cl.
*G06F 11/00* (2006.01)

(52) U.S. Cl. .......... 726/25; 717/172; 717/173; 717/177; 717/178; 713/152

(58) Field of Classification Search .................. 717/172, 717/173, 177, 178; 726/25; 713/152
See application file for complete search history.

(56) References Cited

U.S. PATENT DOCUMENTS

| | | | |
|---|---|---|---|
| 6,219,805 B1 * | 4/2001 | Jones et al. | 714/38.1 |
| 6,327,706 B1 | 12/2001 | Amberg et al. | |
| 6,347,398 B1 | 2/2002 | Parthasarathy et al. | |
| 6,477,703 B1 | 11/2002 | Smith et al. | |
| 6,912,676 B1 * | 6/2005 | Gusler et al. | 714/47.1 |
| 7,073,172 B2 * | 7/2006 | Chamberlain | 717/169 |
| 7,278,163 B2 * | 10/2007 | Banzhof et al. | 726/25 |
| 7,366,892 B2 * | 4/2008 | Spaur et al. | 713/151 |
| 2003/0009696 A1 * | 1/2003 | Bunker et al. | 713/201 |
| 2003/0115511 A1 * | 6/2003 | Kubota | 714/47 |
| 2003/0212909 A1 * | 11/2003 | Chandrashekhar et al. | 713/201 |
| 2004/0139312 A1 * | 7/2004 | Medvinsky | 713/150 |
| 2005/0097547 A1 * | 5/2005 | Ramachandran et al. | 717/177 |
| 2005/0283751 A1 | 12/2005 | Bassin et al. | |
| 2006/0080656 A1 * | 4/2006 | Cain et al. | 717/174 |
| 2006/0230042 A1 * | 10/2006 | Butler et al. | 707/9 |
| 2007/0033445 A1 | 2/2007 | Hirsave et al. | |
| 2007/0033586 A1 | 2/2007 | Hirsave et al. | |

OTHER PUBLICATIONS

Stanley et al., "A New Tool and New Processes to Enhance Software Reliability", ISS'97: World Telecommunications Congress, "Global Network Evolution: Convergence or Collision?" Proceedings, vol. 2, Toronto, Canada, 1997, pp. 527-531.

(Continued)

*Primary Examiner* — April Shan
(74) *Attorney, Agent, or Firm* — Yee & Associates, P.C.; Jeffrey S. LaBaw (57) ABSTRACT

An automatic patch deployment system is provided that deploys a patch according to an assessed risk and a policy. The policy may specify actions to be taken to deploy the patch for different categories of risk. The automatic patch deployment system receives a patch notification, an assessment of the risk, and the policy and deploys the patch accordingly. For example, installation of a patch may be indefinitely delayed for high risk patches, rescheduled for medium risk patches, or installed immediately for low risk patches.

20 Claims, 5 Drawing Sheets

OTHER PUBLICATIONS

Tevis et al., "Methods for The Prevention, Detection and Removal of Software Security Vulnerabilities", ACM Southeast Conference '04, Huntsville, Alabama, Apr. 2-3, 2004, pp. 1997-202.

Neumann et al., "Risks to the Public in Computers and Related Systems", ACM Software Engineering Notes, vol. 29, No. 4, May 2004, pp. 7-14.

Neumann et al., "Risks to the Public in Computers and Related Systems", ACM SIGSOFT, Software Engineering Notes, vol. 27, No. 3, May 2002, pp. 2-19.

Brykczynski et al., "Reducing Internet-Based Intrusions: Effective Security Patch Management", IEEE Software, IEEE Computer Society, 2003, pp. 50-57.

* cited by examiner

METHOD, APPARATUS, AND PROGRAM PRODUCT FOR AUTONOMIC PATCH DEPLOYMENT BASED ON AUTONOMIC PATCH RISK ASSESSMENT AND POLICIES

This application is a continuation of application Ser. No. 11/195,023, filed Aug. 2, 2005, status pending.

BACKGROUND OF THE INVENTION

1. Field of the Invention

The present invention relates to data processing and, in particular, to patching applications in a managed computer environment. Still more particularly, the present invention provides a method, apparatus, and program for automatic patch deployment based on an assessed risk and policies in a managed computer environment.

2. Description of the Related Art

A large computer organization may employ a data center, which is a room full of servers. Each server may run several applications that provide services to customers or other applications within the organization. Often, these servers run continuously, providing services to users throughout the world around the clock. As a result, any downtime experienced by a server is potentially costly or damaging to the reputation of the organization. For example, the organization may have service level agreements with customers that may not be met due to server downtime.

In a managed computer environment, deployment of software is controlled by a managing server. When an update, also referred to as a "patch," for an application is available, an administrator may determine whether to push the update to the managed endpoints. Managed endpoints may be any device within the managed computer environment, such as end user client devices, servers, routers, and the like. In the case of servers, a patch may disrupt the operation of the device. Therefore, the administrator must assess the risk of executing the update and deploy the patch accordingly.

Currently, deployment of a patch is a manual process in which the data center administrator views patches that have been released, reads the documentation, and determines whether the patch is applicable to the data center. However, patch deployment is not a trivial task, and the decision to install a patch, as well as when and how to install the patch, may be made with incomplete information. The administrator must exercise extreme caution when assessing the risk of a patch and scheduling deployment.

SUMMARY OF THE INVENTION

The present invention recognizes the disadvantages of the prior art and provides an automatic patch deployment system that deploys a patch according to an assessed risk and a policy. The policy may specify actions to be taken to deploy the patch for different categories of risk. The automatic patch deployment system receives a patch notification, an assessment of the risk, and the policy and deploys the patch accordingly. For example, installation of a patch may be indefinitely delayed for high risk patches, rescheduled for medium risk patches, or installed immediately for low risk patches.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
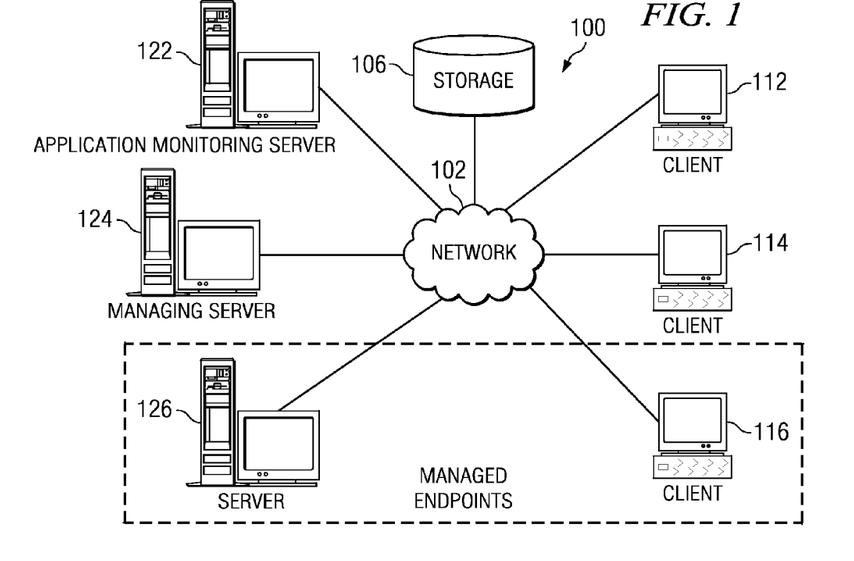
FIG. 1 depicts a pictorial representation of a network of data processing systems in which aspects of the present invention may be implemented.
Figure 2:
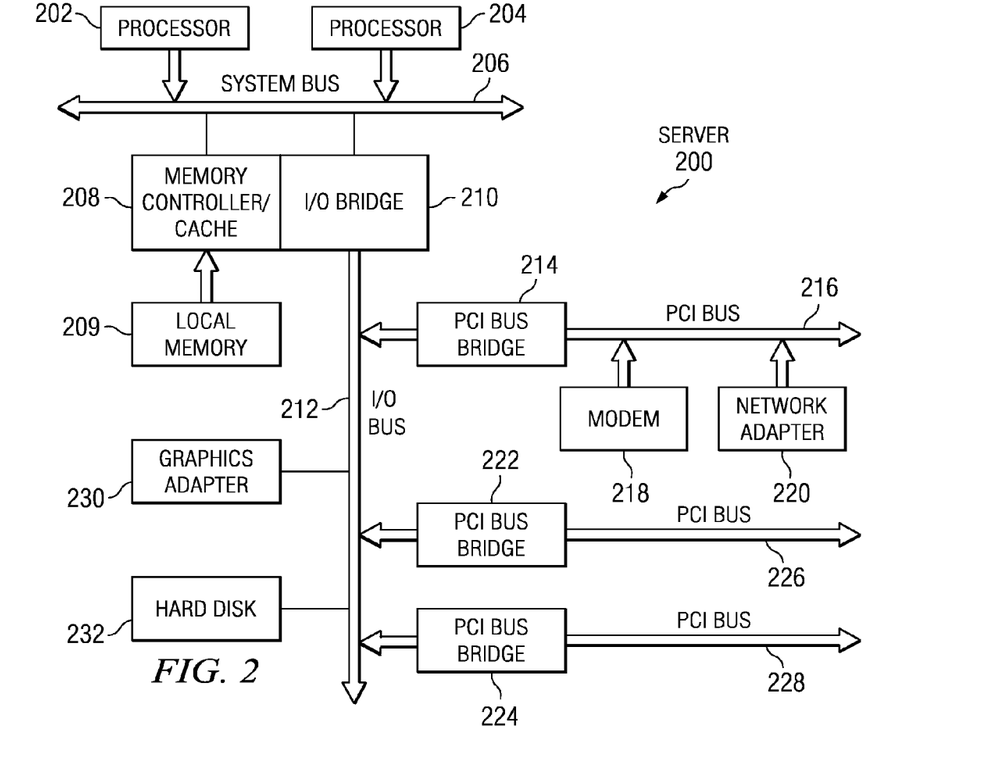
FIG. 2 is a block diagram of a data processing system that may be implemented as a server in accordance with an illustrative embodiment of the present invention.
Figure 3:
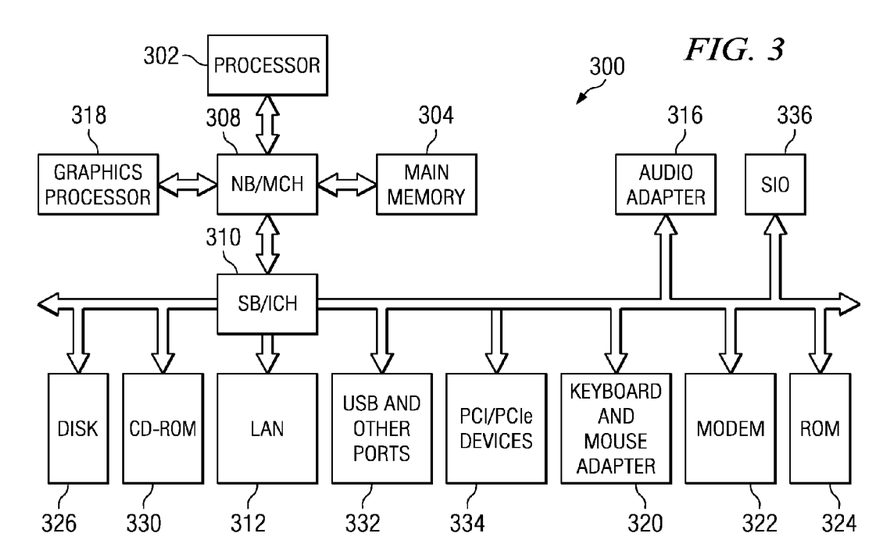
FIG. 3 is a block diagram of a data processing system in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 122, 124, 126 connect to network 102 along with storage unit 106. In addition, clients 112, 114, 116 connect to network 102. These clients 112, 114, 116 may be, for example, personal computers or network computers. In the depicted example, server 126, for example, provides data and/or applications to clients 112, 114, 116. Clients 112, 114, 116 are clients to server 122. Network data processing system 100 may include additional servers, clients, and other devices not shown.

In accordance with an illustrative aspect of the present invention, server 124 provides management services for devices in network data processing system 100. For example, server 126 and client 116 may be managed nodes in the managed computer environment. Server 122 provides application monitoring to determine the status of an application that is to be patched. Server 122 may collect from an application running on, for example, server 126, metrics that indicate a level of activity. Although depicted in the example shown in FIG. 1 as separate computer devices in network data processing system 100, managing server 124 and application monitoring server 122 may be server applications or processes running on the same machine or different machines.

In accordance with an illustrative aspect of the present invention, server 124 automatically assesses the risk of installing the patch on a managed endpoint. A patch metadata may contain a list of files that are "touched" by the patch. The term "touched," as used herein, refers to when a file is modified, updated, or deleted by a patch. For example, the patch may replace a file with a newer version of a file, modify attributes of the file, or delete the file.

Application monitoring server 122 may collect data about the application to be patched, such as the amount of memory being used, which may indicate that the application is under heavy use, or whether one or more touched files are locked by the application to be patched or another application. Using the list of touched files, the information collected by application monitoring server 122, and other information, such as time of patch deployment and the like, managing server 124 determines a measure of risk for deploying the patch.

The level of risk represents likelihood that the patch will disrupt activity of the server. For example, if a touched file is locked by an application, the server will require a reboot to gain access to the file. A reboot is a very disruptive action. As another example, if a large amount of memory is being used by the server, then there is a high likelihood that the patching the application will negatively affect the productivity of the server.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system. As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226, 228, as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache, such as found in memory controller/cache 208 of FIG. 2, or main memory 304 of FIG. 3. A processing unit may include one or more processors or central processing units, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

Figure 4:
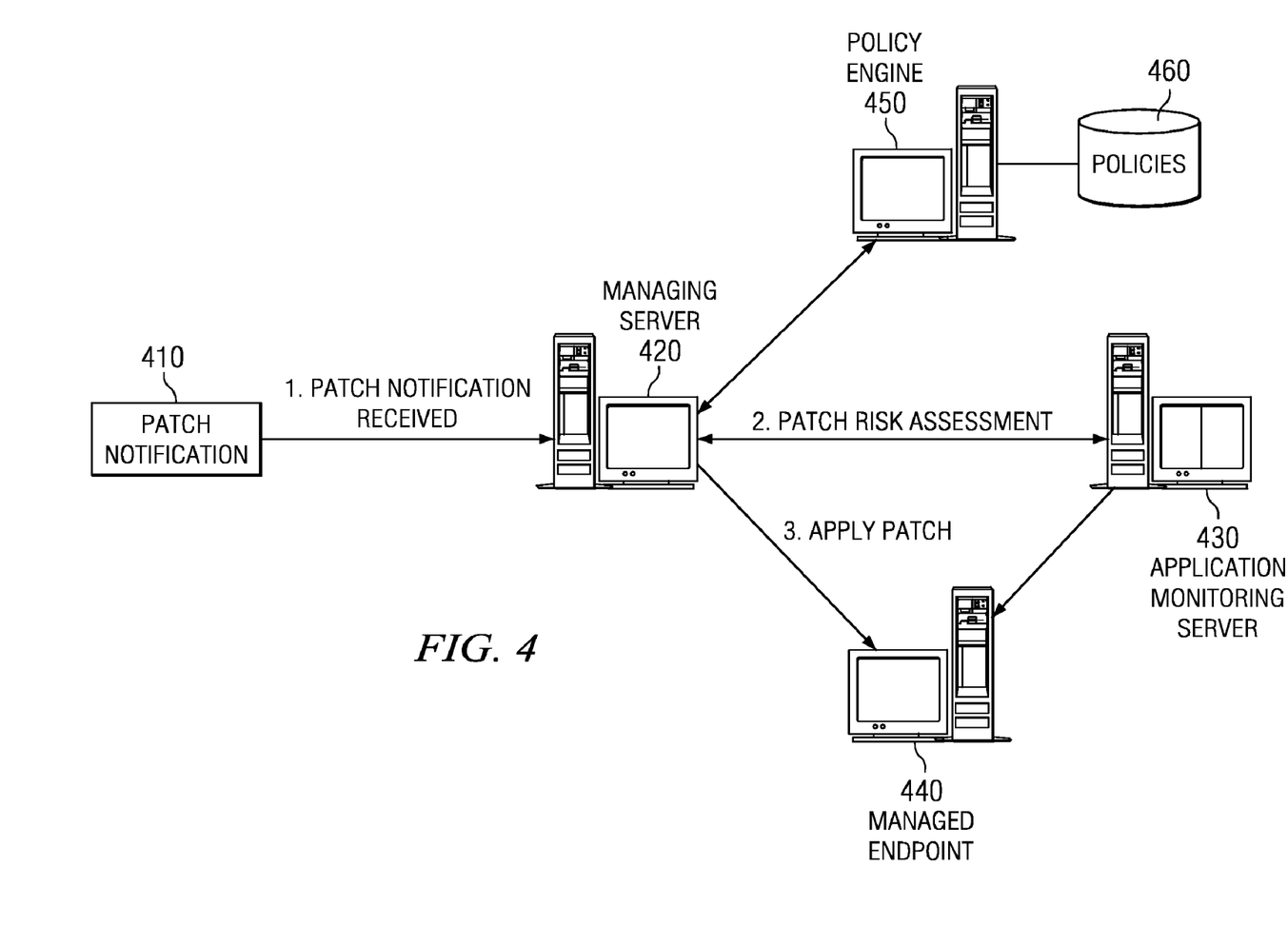
FIG. 4 is a visual diagram illustrating the operational flow of an automatic risk assessment system in accordance with exemplary aspects of the present invention.

FIG. 4 is a visual diagram illustrating the operational flow of an automatic risk assessment system in accordance with exemplary aspects of the present invention. In step 1, a new patch is released by a vendor and patch notification 410 is received at managing server 420. A patch may be released, for example, to update functionality of an application, to fix bugs, or to update a device driver. The patch itself may replace files with newer files, modify attributes of a file, or delete files, for instance. The patch may be associated with a particular application, an operating system component, or a device driver, for example. Patch notification 410 may include the patch files and metadata describing the patch. Patch notification 410 may also include a list of touched files or, in other words, files affected by the patch.

In step 2, managing server 420 performs patch risk assessment. Managing server 420 checks the applicability of the patch based on the files affected by the patch, activity of the node being patched from metrics collected by application monitoring server 430, and other factors.

In step 3, managing server 420 applies the patch to managed endpoint 440. Based on the risk assessment from step 2, managing server 420 can apply the patch immediately, schedule deployment of the patch for a later time, or notify the administrator of a high risk so the administrator may take appropriate measures. Managing server 420 also communicates with policy engine 450, which identifies policies from policy storage 460 that apply to the patch being deployed. Managing server 420 then applies the identified policies when deploying the patch.

For example, managing server 420 may send patch information to policy engine 450 indicating that the patch updates an application associated with a service level agreement and is to be deployed in China. Policy engine 450 then identifies the policies that apply to patches that affect applications associated with a service level agreement and policies that apply to scheduling patch deployment in China. Managing server 420 may then apply those policies to the patch based on the risk assessment and schedule installation of the patch accordingly.

Figure 5:
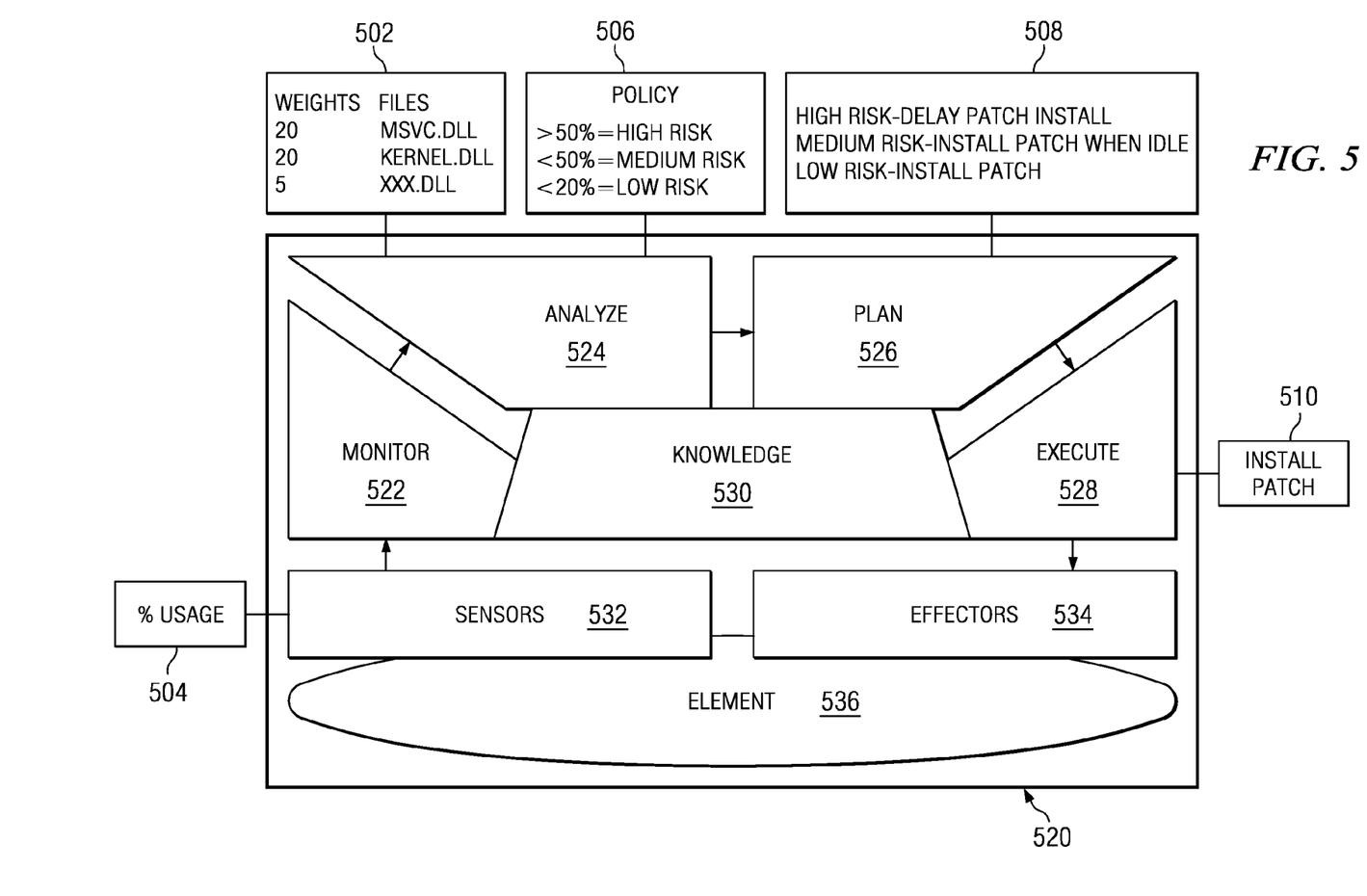
FIG. 5 is a visual diagram illustrating the operational flow of an automatic patch deployment system in accordance with exemplary aspects of the present invention.

Turning to FIG. 5, a visual diagram is shown illustrating the operational flow of an automatic patch deployment system in accordance with exemplary aspects of the present invention. Automatic patch deployment system 520 is illustrated using a MAPE (monitor, analyze, plan, execute) loop diagram. The system begins by monitoring individual files and assigning weights, shown as 502. Files may be assigned higher lower weights based on how frequently, or recently, they are accessed, for example. In the depicted example, the file MSVC.DLL is assigned a weight of 20, the file Kernel.DLL is assigned a weight of 20, and the file XXX.DLL is assigned a weight of 5.

Monitor component 522 monitors activity on the endpoint on which the patch is to be installed. The endpoint is shown as element 536, although element 536 may represent an application, operating system component, device driver or any other element that is to be affected by the patch. In the depicted example, monitor component 522 collects usage metrics 504 to monitor activity, such as a percentage of usage of resources being used, for example, via sensors 532. For instance, sensors 532 may be an application monitor component of an application being patched and receive a metric indicating a percentage of memory being used by the application. A person of ordinary skill in the art will recognize that other types of monitoring and sensors may also be used within the scope of the present invention.

Analysis component 524 analyzes the patch based on weights 502, metrics 504, and policy 506 to assess the risk of the patch. Analysis component 524 may determine a percentage risk that the patch will result in a hang or reboot or will significantly degrade productivity of the endpoint. Policy 506 may, for example, define how the percentage risk is categorized into high risk, medium risk, or low risk. In the depicted example, policy 506 defines a 50% or greater risk as high risk, less than 50% and greater than or equal to 20% as medium risk, and less than 20% as low risk. High risk may indicate, for example, that the risk is likely to require a reboot, while low risk may indicate that the patch can be installed immediately without significantly affecting productivity of the managed endpoint.

Policy 506 may be specific to a particular patch, specific to a particular endpoint, or universal to all patches being deployed to all endpoints. For example, a policy for an end user client device may be more tolerant than a policy for a server providing critical services to customers under a service level agreement. As another example, a policy for a non-critical patch may allow a greater distribution within the medium risk category because productivity of the endpoint may be more important than the timeliness of the patch.

Planning component 526 determines how to install the patch based on the risk assessment from analysis component 524. More particularly, planning component 526 may make a determination of whether to install the patch and when to install the patch based on policy 508. In the depicted example, policy 508 indicates that installation of a patch with high risk shall be delayed, while a patch with medium risk shall be installed when the endpoint is idle and a patch with low risk may be installed immediately.

Once planning component 526 determines that a patch is to be installed, execution component 528 effectuates plan from planning component 526 to install the patch 510 via effectors

534. Effectors 534 apply the patch to element 536 by replacing files, updating files, modifying attributes, altering configurations, deleting files, and the like.

Monitor component 522, analysis component 524, planning component 526, and execution component 528 operate based on knowledge 530. Knowledge 530 is the engine that drives the MAPE loop. Knowledge 530 schedules and analyzes the monitoring data. Knowledge 530 executes based on the policies and applies policies based on the data.

Figure 6:
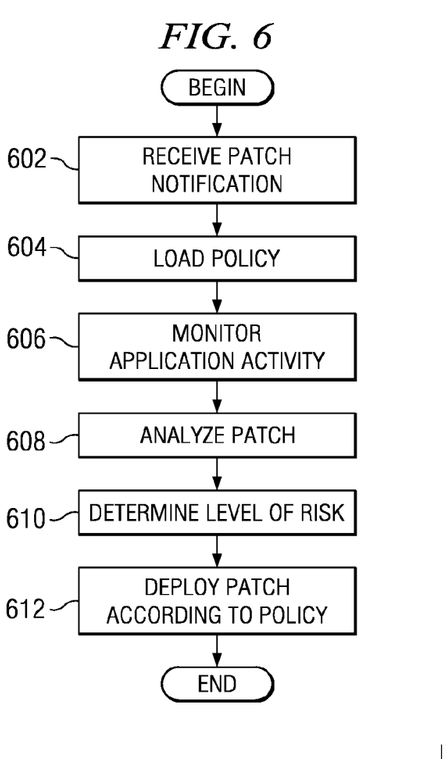
FIG. 6 is a flowchart illustrating operation of an automatic patch deployment system in accordance with exemplary aspects of the present invention.

FIG. 6 is a flowchart illustrating operation of an automatic patch deployment system in accordance with exemplary aspects of the present invention. Operation begins and the automatic patch deployment system receives a patch notification (block 602). Then, the automatic patch deployment system loads a policy for patch deployment (block 604) and monitors application activity (block 606). Next, the automatic patch deployment system analyzes the patch (block 608) and determines a level of risk for the patch (block 610). Thereafter, the automatic patch deployment system deploys the patch according to the policy (block 612) and operation ends.

Figure 7:
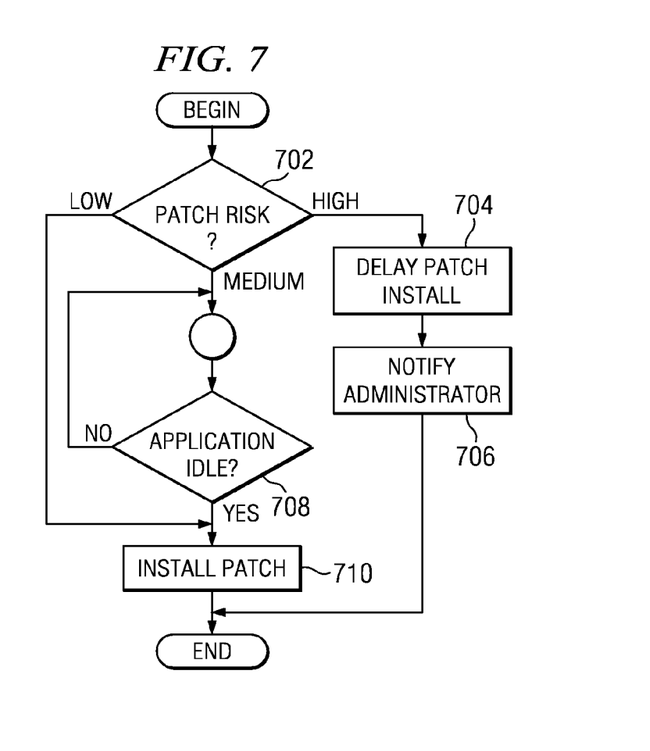
FIG. 7 is a flowchart illustrating operation of automatic patch deployment system in accordance with an example policy in accordance with an exemplary embodiment of the present invention.

FIG. 7 is a flowchart illustrating operation of automatic patch deployment system in accordance with an example policy in accordance with an exemplary embodiment of the present invention. More particularly, FIG. 7 illustrates deployment of a patch according to the policy shown as element 508 in FIG. 5. Operation begins and the automatic patch deployment system determines whether the patch risk is high, medium, or low (block 702). If the patch risk is high, the automatic patch deployment system delays the patch install (block 704) and notifies the administrator (block 706) of the delayed patch install. The administrator may then manually assess the situation and determine whether activity of the endpoint machine should be interrupted to deploy the patch.

If the patch risk is medium in block 702, the automatic patch deployment system determines whether the application is idle (block 708). If the application is not idle, the automatic patch deployment returns to block 708 to wait until the application is idle. If the application is idle in block 708, the automatic patch deployment system installs the patch (block 710) and operation ends.

If the patch risk is low in block 702, then the patch is not likely to interrupt activity of the endpoint machine, and the automatic patch deployment system proceeds directly to block 710 to install the patch and operation ends.

The example flow of operation shown in FIG. 7 is specific to one example policy. The deployment of a patch may be fully customized using a policy file, such as policy 508 shown in FIG. 5. That is, an administrator, when creating the policy, may determine that a patch with high risk may be installed when the application is idle. A policy may specify that when a patch having a medium risk is deployed, the patch may be installed immediately with a notification being sent to the administrator so the administrator may monitor completion of the patch. Thus, the policy may vary depending upon the endpoint device, the element being patched, whether there is a service level agreement, etc.

While the example policy is based on three discrete categories of risk, the policy may also be based on more or fewer categories of risk or even other representations of risk, such as percentage values, types of risk (reboot, hang, high memory consumption, low disk space, etc.), and the like.

Furthermore, FIG. 5 depicts separate components 502, 504, 506, 508, that specify policy information for assessing and deploying a patch; however, all of these components may be stored in a single policy file. The policy file may take the form of a table, text file, or other file type. In a more specific embodiment, the policy file may take the form of a markup language document, such as an extensible markup language (XML) document or the like.

Thus, the present invention solves the disadvantages of the prior art by providing an automatic patch deployment system that deploys the patch according to the assessed risk and a policy. The policy may specify actions to be taken to deploy the patch for different categories of risk. The automatic patch deployment system receives a patch notification, an assessment of the risk, and the policy and deploys the patch accordingly. For example, installation of a patch may be indefinitely delayed for high risk patches, rescheduled for medium risk patches, or installed immediately for low risk patches.

The invention can take the form of an entirely hardware embodiment, an entirely software embodiment, or an embodiment containing both hardware and software elements. In one preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with an instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatic patch deployment, the method comprising:

receiving, by a hardware processor, a patch to be installed for a software component on an endpoint device;

receiving, by the hardware processor, a risk assessment for the patch identifying a level of risk for installing the patch on the endpoint device, wherein the risk level is a probability that installing the patch into the application will result in a hang of the endpoint device or require a reboot of the endpoint device, and wherein the risk level is based on activity information from a monitor of the endpoint device, wherein the activity information is a percentage of resources of the endpoint device being used;

identifying a policy that is applicable to the patch from a policy storage, wherein the policy is applicable to the patch based on a service level agreement for the software component and a geographical location of where the patch is to be applied;

retrieving, by the hardware processor, a policy; and deploying, by the hardware processor, the patch according to the level of risk and the policy.

2. The method of claim 1, wherein the level of risk is one of high, medium, or low.

3. The method of claim 2, wherein deploying the patch includes delaying installation of the patch and notifying an administrator if the level of risk is high.

4. The method of claim 2, wherein deploying the patch includes installing the patch when the software component is idle if the level of risk is medium.

5. The method of claim 2, wherein deploying the patch includes installing the patch immediately if the level of risk is low.

6. The method of claim 1, wherein the policy is retrieved from a policy file.

7. The method of claim 6, wherein the policy file is an extensible markup language file.

8. An automatic patch deployment system comprising:

a managing server comprising a hardware processor executing computer usable program code, wherein the managing server receives a patch to be installed for a software component on an endpoint device and receives a risk assessment for the patch identifying a level of risk for installing the patch on the endpoint device, wherein the risk level is a probability that installing the patch into the application will result in a hang of the endpoint device or require a reboot of the endpoint device, and wherein the risk level is based on activity information from a monitor of the endpoint device, wherein the activity information is a percentage of resources of the endpoint device being used;

a policy engine that identifies one or more policies for the patch, wherein the policy is identified based on a service level agreement for the software component and a geographical location of where the patch is to be applied and sends the one or more policies to the managing server, wherein the managing server deploys the patch at the endpoint device according to the level of risk and the one or more policies.

9. The automatic patch deployment system of claim 8, wherein the level of risk is one of high, medium, or low.

10. The automatic patch deployment system of claim 9, wherein deploying the patch includes delaying installation of the patch and notifying an administrator if the level of risk is high.

11. The automatic patch deployment system of claim 9, wherein deploying the patch includes installing the patch when the software component is idle if the level of risk is medium.

12. The automatic patch deployment system of claim 9, wherein deploying the patch includes installing the patch immediately if the level of risk is low.

13. The automatic patch deployment system of claim 8, wherein the policy is retrieved from a policy storage.

14. A computer program product comprising:

a non-transitory computer usable medium having computer usable program code for automatic patch deployment, the computer program product including:

computer usable program code for receiving a patch to be installed for a software component on an endpoint device;

computer usable program code for receiving a risk assessment for the patch identifying a level of risk for installing the patch on the endpoint device, wherein the risk level is a probability that installing the patch into the application will result in a hang of the endpoint device or require a reboot of the endpoint device, and wherein the risk level is based on activity information from a monitor of the endpoint device, wherein the activity information is a percentage of resources of the endpoint device being used;

computer usable program code for identifying a policy that is applicable to the patch from a policy storage, wherein the policy is applicable to the patch based on a service level agreement for the software component and a geographical location of where the patch is to be applied computer usable program code for retrieving a policy; and computer usable program code for deploying the patch according to the level of risk and the policy.

15. The computer program product of claim 14, wherein the level of risk is one of high, medium, or low.

16. The computer program product of claim 15, wherein the computer usable program code for deploying the patch includes computer usable program code for delaying installation of the patch and notifying an administrator if the level of risk is high.

17. The computer program product of claim 15, wherein the computer usable program code for deploying the patch includes computer usable program code for installing the patch when the software component is idle if the level of risk is medium.

18. The computer program product of claim 15, wherein the computer usable program code for deploying the patch includes computer usable program code for installing the patch immediately if the level of risk is low.

19. The computer program product of claim 14, wherein the policy is retrieved from a policy file.

20. The computer program product of claim 19, wherein the policy file is an extensible markup language file.

* * * * *